(12) United States Patent
Kawasaki

(10) Patent No.: US 10,063,827 B2
(45) Date of Patent: Aug. 28, 2018

(54) IMAGE PROCESSING APPARATUS, IMAGING APPARATUS, IMAGE PROCESSING PROGRAM, AND IMAGE PROCESSING METHOD

(71) Applicant: Toshiyuki Kawasaki, Kanagawa (JP)

(72) Inventor: Toshiyuki Kawasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/122,210

(22) PCT Filed: Mar. 16, 2015

(86) PCT No.: PCT/JP2015/058641
§ 371 (c)(1),
(2) Date: Aug. 29, 2016

(87) PCT Pub. No.: WO2015/141860
PCT Pub. Date: Sep. 24, 2015

(65) Prior Publication Data
US 2016/0373710 A1    Dec. 22, 2016

(30) Foreign Application Priority Data

Mar. 17, 2014 (JP) .................. 2014-053025

(51) Int. Cl.
*H04N 9/04* (2006.01)
*H04N 5/232* (2006.01)
(Continued)

(52) U.S. Cl.
CPC ............... *H04N 9/78* (2013.01); *B60R 11/04* (2013.01); *H04N 5/23245* (2013.01);
(Continued)

(58) Field of Classification Search
CPC .......... H04N 9/078; H04N 9/045; H04N 9/68; H04N 9/77; H04H 5/23245; B60R 11/04
(Continued)

(56) References Cited

U.S. PATENT DOCUMENTS 9,036,625 B2 * 5/2015 Umeda .................. G06T 1/00
358/1.9
9,294,695 B2    3/2016 Kageyama et al.
(Continued)

FOREIGN PATENT DOCUMENTS

JP    2003-235050    8/2003
JP    2012-010141    1/2012
(Continued)

OTHER PUBLICATIONS

International Search Report dated May 26, 2015 in PCT/JP2015/058641 filed on Mar. 16, 2015.
(Continued)

*Primary Examiner* — Tuan Ho
*Assistant Examiner* — Marly Camargo
(74) *Attorney, Agent, or Firm* — Oblon, McClelland, Maier & Neustadt, L.L.P.

(57) ABSTRACT

An image processing apparatus for performing image processing for image data. The image processing apparatus includes a signal separation unit configured to separate a color signal and a luminance signal included in the image data, and a color signal control unit configured to control chroma of the color signal used for the image processing based on a luminance value of the luminance signal.

9 Claims, 8 Drawing Sheets

(51) Int. Cl.
  *B60R 11/04* (2006.01)
  *H04N 9/78* (2006.01)
  *H04N 9/68* (2006.01)
  *H04N 9/77* (2006.01)

(52) U.S. Cl.
  CPC ............. *H04N 9/045* (2013.01); *H04N 9/68* (2013.01); *H04N 9/77* (2013.01)

(58) Field of Classification Search
  USPC .............. 348/223.1, 234, 631, 222.1, 233.1; 382/162, 167
  See application file for complete search history.

(56) References Cited

U.S. PATENT DOCUMENTS

| | | | |
|---|---|---|---|
| 2004/0051790 A1* | 3/2004 | Tamaru | H04N 5/202 348/223.1 |
| 2004/0085459 A1 | 5/2004 | Hoshuyama et al. | |
| 2004/0130638 A1* | 7/2004 | Sakamoto | H04N 5/2355 348/254 |
| 2005/0185535 A1 | 8/2005 | Kawasaki | |
| 2010/0231759 A1* | 9/2010 | Tsutsumi | H04N 5/23203 348/242 |
| 2013/0177206 A1 | 7/2013 | Hata | |
| 2014/0313369 A1* | 10/2014 | Kageyama | G06T 11/001 348/223.1 |

FOREIGN PATENT DOCUMENTS

| | | |
|---|---|---|
| JP | 2013-098805 | 5/2013 |
| JP | 2013-142929 | 7/2013 |
| JP | 2013-218631 | 10/2013 |

OTHER PUBLICATIONS

Japanese Office Action dated Apr. 18, 2018 in Japanese Patent Application No. 2014-053025.

* cited by examiner

IMAGE PROCESSING APPARATUS, IMAGING APPARATUS, IMAGE PROCESSING PROGRAM, AND IMAGE PROCESSING METHOD

TECHNICAL FIELD

The present invention relates to an image processing apparatus, an imaging apparatus, an image processing program and an image processing method.

BACKGROUND ART

In recent years, an imaging apparatus is widely applied for an in-vehicle camera which is mounted on a vehicle.

Here, types of the in-vehicle cameras include, for example, a rear-view camera which helps checking behind when parking a vehicle, a side-view camera which helps checking dead angles of sides of a vehicle when parking a vehicle in tandem, and a front-view camera which helps checking left and right when, for example, entering into an intersection. Also, other types of the in-vehicle cameras include, for example, a camera for a drive-recorder which takes and records images in the direction of travel of the vehicle all the time, and a camera for front sensing which is used for recognition of objects such as white lines of a road, median strips, road signs, traffic signals, display boards, etc.

It is required for an in-vehicle camera to obtain an image (an appropriate image) in which a subject (object of shooting) is recognizable even in the case where the image is taken in a dark place such as on a road without a street light for night or in a tunnel without illumination. In order to obtain an appropriate image, for an in-vehicle camera, various countermeasures are taken including a longer exposure time of an imaging element (image sensor), an increased analog gain of an imaging element, a brighter lens with a smaller F value, or the like.

Here, the longer exposure time is for increasing an amount of received light by increasing the time the acceptance surface of the imaging element is irradiated with light. Also, the increased analog gain is for making an output image look brighter by increasing an amplitude of a detected signal. Furthermore, the smaller F value of the lens is for making the lens brighter, because, in general, the smaller the F value is, the brighter the lens becomes.

With these countermeasures, it becomes possible for an in-vehicle camera to make a dark area of an image look brighter, thereby making a subject in a dark area of an image easy for recognition even if it is taken at night.

On the other hand, when an image includes a bright area and a dark area as in a downtown at night, in the case where the subject is a light emitter such as a street light, a head lamp of an oncoming car, a tail lamp of a vehicle ahead, a blinker, a traffic signal, or the like, sometimes, a so-called blown-out highlight appears in the image.

In the case where a blown-out highlight appears in an image, it becomes difficult to discriminate color of the subject, thereby making it difficult to discriminate between a tail lamp and a blinker, between a street lamp and a traffic signal, or between colors of traffic signals.

Also, a blown-out highlight in an image of the subject appears in the case where the light of the head lamp of the vehicle is emitted on the subject.

Here, in the case where the subject on which the light of the head lamp is emitted is a vehicle ahead, there is a problem that it is difficult to determine whether or not the tail lamp of the vehicle ahead is lit, because of the blown-out highlight of the image of the vehicle ahead.

It can be seen that in order to suppress the blown-out highlight of the image of the subject, various countermeasures for an in-vehicle camera can be considered including, contrary to the settings as described above for obtaining an appropriate image in a dark place, a shorter exposure time of an imaging element, a decreased analog gain of an imaging element, a darker lens with a bigger F value, or the like.

However, with these countermeasures, the entire image becomes dark, and therefore, in the case where these countermeasures are used for an in-vehicle camera, especially for a rear-view camera, a front-view camera, or a front sensing camera, it becomes difficult to recognize, for example, a condition of a dark road surface. The reason for the difficulty is that it is difficult to include the luminance range of the darkness of the road surface and the brightness of the light source within a dynamic range of the imaging element.

Meanwhile, in recent years, there are methods such as HDR (High Dynamic Range), WDR (Wide Dynamic Range), or the like, for expanding the dynamic range of the imaging element.

The HDR and the WDR are techniques for making a dynamic range in an image bigger than normal by obtaining an image for which longer exposure time is applied to the imaging element and an image for which shorter exposure time is applied to the imaging element, combining the two images, and creating one image.

For an imaging element to obtain two images with different exposure times, there is a method in which, using one pixel, an image for which longer exposure time is applied and an image for which shorter exposure time is applied are obtained at different timings by one pixel of the image elements. Also, for an imaging element to obtain two images with different exposure times, there is another method in which images with different exposure times are obtained by providing two areas in one pixel: an area where longer exposure time is applied, and another area where shorter exposure time is applied; thereby images with different exposure times can be obtained in real time.

In the case where two images with different exposure times are obtained and combined for creating an image, image data for a dark image area such as a dark road at night which is cut from the image with longer exposure time and image data for a bright image area such as a bright sky which is cut from the image with shorter exposure time are combined for creating one image.

By using HDR or WDR, a blown-out highlight of a bright area and an underexposure of a dark area can be suppressed, and an image at a time of low illumination can be obtained as a bright and clear image by the in-vehicle camera.

However, when combining two images with different exposure times, it is difficult to accurately determine light and shade of the bright area and the dark area, and divide the image areas. In other words, when combining two images using HDR or WDR, it is easy to separate a relatively large bright area from a dark image, but it is difficult to identify a small bright area such as a point light source and separate it from the dark image. Therefore, in the case where the subject whose blown-out highlight should be suppressed is a luminous point or the like, a sufficient effect cannot be obtained from HDR or WDR.

Also, a blown-out highlight in the case where a luminous point is a subject occurs because each color signal value of RGB (Red, Green, Blue) becomes closer to a saturation value, thereby a value difference becomes infinitesimal and color of an emission source becomes thinner and closer to white color.

Based on the above, in the case where a luminous point is a subject, a method can be considered in which the color of the luminous point appears by increasing the chroma of the entire image data in a state where the color is thinner.

However, in this case, because the chroma other than the luminous point is also increased, not only the overall color of the image becomes dark creating an uncomfortable feeling, but also the chroma of the black area increases. Therefore, the obtained image includes increased color noise created by increased signals of the black area containing a lot of noise, thereby S/N (Signal/Noise) ratio becomes lower.

It should be noted that, in order to form an image with little collapse color and little color saturation even when a subject has a big difference between the light and dark, a technique is proposed in which color component signals in each corresponding pixel position are compared with each other between the N original images and the color component signal which produces a higher chroma is set as a color component signal of the output image (see, for example, Patent Document 1).

However, in the prior art, a process is needed in which, similar to HDR or WDR, two images with different exposure times need to be obtained before combining the obtained images.

Also, the prior art cannot solve a problem of difficulty in recognizing the color of the subject image with the blown-out highlight described above because an image with a shorter exposure time is used for the blown-out highlight area in an image with a longer exposure time.

Also, the prior art has a problem, for example, in which because a black area with no chroma ends up having a chroma due to low illumination noise, when the chroma is emphasized, colors are attached to the black area, generating an image different from the actual state.

It is a general object of the present invention to provide an image processing apparatus which is capable of reproducing the color of a bright subject even in the case where the bright subject is included in a dark image.

DISCLOSURE OF THE INVENTION

The present invention includes an image processing apparatus for performing image processing for image data. The image processing apparatus includes a signal separation unit configured to separate a color signal and a luminance signal included in the image data, and a color signal control unit configured to control the color signal used for the image processing based on a luminance value of the luminance signal.

According to the present invention, the color of a bright subject can be reproduced even in the case where the bright subject is included in a dark image.

MODE FOR CARRYING OUT THE INVENTION

Figure 1:
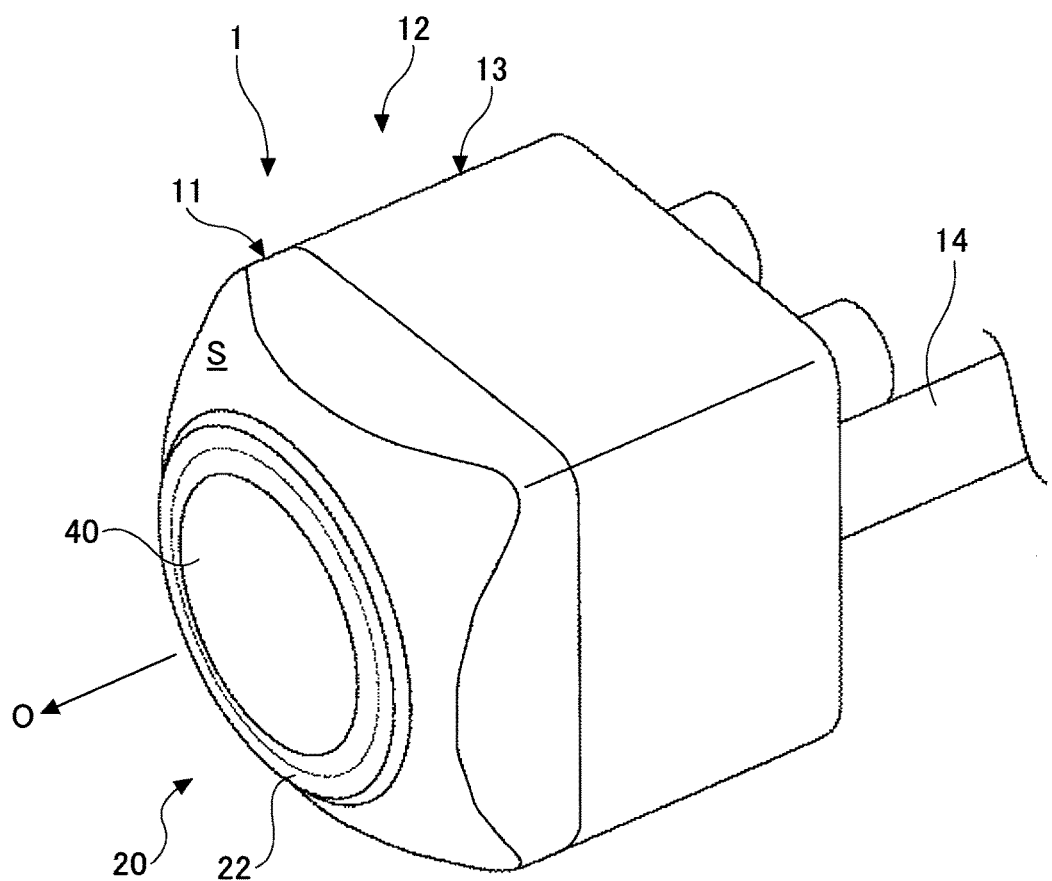
FIG. 1 is a perspective view illustrating an embodiment of an imaging apparatus according to the present invention.

In the following, embodiments of an image processing apparatus, an imaging apparatus, an image processing method, and an image processing program according to the present invention will be described referring to the drawings.

<<Imaging Apparatus>>

First, an embodiment of an imaging apparatus 1 according to the present invention will be described. The imaging apparatus according to the present embodiment includes an image processing apparatus according to the present invention and an imaging unit configured to obtain image data.

Here, the imaging apparatus according to the present embodiment is, for example, mounted on a vehicle (not shown) and applied to various types of in-vehicle cameras such as a drive recorder camera or an object detection camera which takes images in the direction of travel of the vehicle, or a camera which helps checking lateral and rear sides of the vehicle.

However, an application of the imaging apparatus according to the present invention is not limited to the above application. In other words, the imaging apparatus according to the present invention can also be applied to, for example, a monitoring camera installed in a super market, a convenience store, or the like. Also, the imaging apparatus according to the present invention can be applied to a safety apparatus for a railway or a ship, or an imaging apparatus in the FA (Factory Automation) field.

<Configuration of Imaging Apparatus>

FIG. 1 is a perspective view illustrating an embodiment of the imaging apparatus 1 according to the present invention. As shown in the figure, the imaging apparatus 1 includes a barrel unit 7 (imaging optical system, shown in FIG. 2), a housing unit 12 consisting of a front housing unit 11 and a rear housing unit 13, and an electric wire 14.

Figure 2:
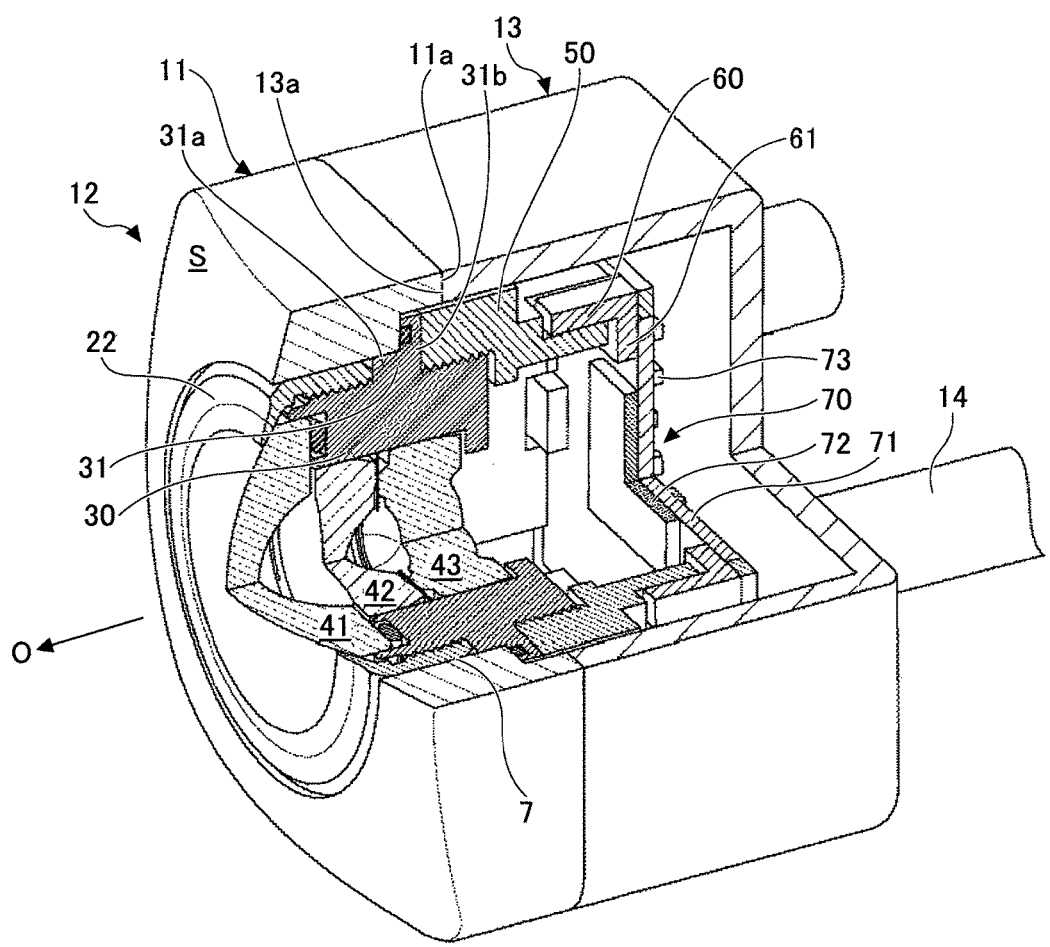
FIG. 2 is a cross-sectional perspective view of the imaging apparatus of FIG. 1.

FIG. 2 is a cross-sectional perspective view of the imaging apparatus 1. As shown in the figures, an imaging optical system 20 and an electric equipment substrate unit 70 are attached to the front housing unit 11.

The front housing unit 11 forms at least an outer surface S which surrounds the surroundings of an objective lens (lens 41 in this example), that is, a lens barrel 30, the surroundings being with respect to a direction orthogonal to imaging optical axis O (hereinafter, also referred to as radial direction).

The front housing unit 11, whose front shape viewed from the imaging optical axis O direction is rectangular, has an overall cuboid shape and forms the front side (a side closer to a subject: hereinafter, aside closer to a subject will be simply referred to as a subject side) portion of the housing 12. Thus, the front housing unit 11 can be attached to the rear housing unit 13 which forms the rear side (a side closer to the electric equipment substrate unit 70, hereinafter, a side closer to the electric equipment substrate unit 70 will be simply referred to as a substrate side) of the housing 12.

The rear housing unit 13 has a shape of a box whose one end is open, and, by being combined with the front housing unit 11, forms the housing 12 which accommodates the barrel unit 7 and the electric equipment substrate unit (imaging element 72). Also, the electric wire 14 is provided for the rear housing unit 13.

The electric wire 14 provides electric power to the electric equipment substrate unit 70 which will be described later (electronic components 73 which will be described later), or is used for transmission of image data obtained by the imaging element 72 attached to the electric equipment substrate unit 70, which will be described later.

The imaging optical system 20 includes a set of optical elements including the lens 41, a lens 42, and a lens 43 in the lens barrel 30.

The lens barrel 30 has a shape of tube in which the set of optical elements 41, 42 and 43 is held, whose inner diameter is large near the front side (object of shooting side) and gradually becomes small toward the rear side (substrate side).

An outer periphery of the lens barrel 30 has a convex portion 31 formed along the imaging optical axis O in the intermediate part. The convex portion 31 is formed going around the outer periphery of the lens barrel 30.

The convex portion 31 includes a low height front convex portion 31*a* in the front side (subject side) and a high height rear convex portion 31*b* in the rear side (substrate side). The front convex portion 31*a* and the rear convex portion 31*b* are integrated.

The lens barrel 30 has a large inner diameter in its front side (object of shooting side), has a small inner diameter in its rear side (substrate side), and has an inner diameter, which is neither large nor small but intermediate, in its intermediate part between the front side and the rear side.

In the lens barrel 30, the lens 41 is placed at the front side where the inner diameter is large, and lenses 42 and 43 are placed at the intermediate part where the inner diameter is intermediate. At the rear side where the inner diameter is small, the lens 43 is locked so that the lens 43 will not fall out from the lens barrel 30.

Also, at the front part of the outer peripheral side of the lens barrel 30, a ring-shaped optical element holding member 22 is placed.

It should be noted that the set of optical elements is for forming an image at an arbitrary position in order to obtain the image, and that it is sufficient for the set to have at least one or more lenses. In other words, the set of optical elements can be configured appropriately according to the optical performance required for the imaging apparatus 1 (imaging optical system 20).

The electric equipment substrate unit 70 includes a substrate 71 with an almost quadrilateral shape, the imaging element 72 with a quadrilateral shape mounted in the center part of the surface (surface of the subject side) of the substrate 71, and a plurality of the electronic components 73 mounted on the back of the substrate 71.

<Functional Blocks of Imaging Apparatus>

Next, an example of functional blocks of the imaging apparatus 1 will be described.

Figure 3:
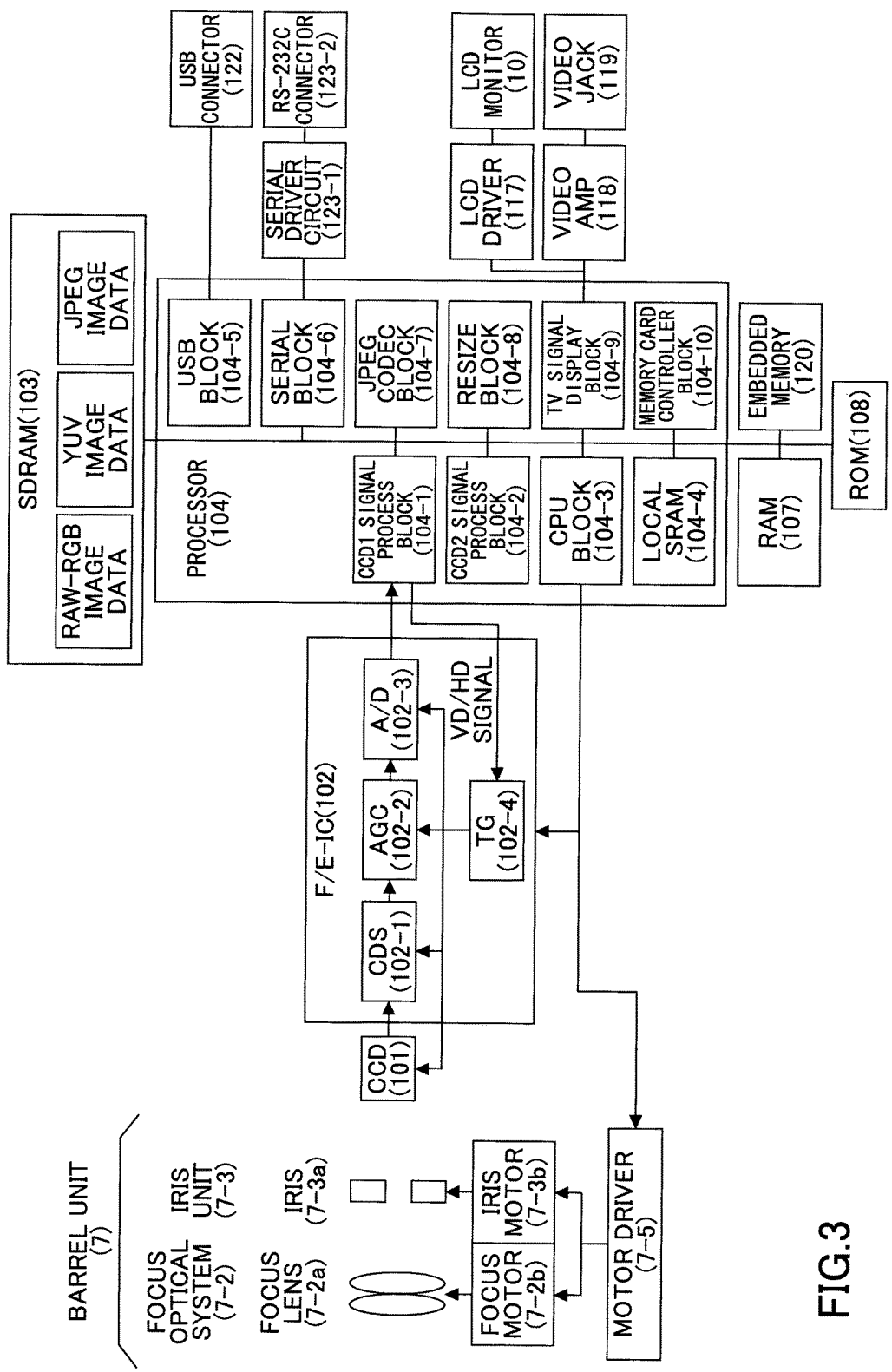
FIG. 3 is a functional block diagram illustrating a functional structure example of the imaging apparatus of FIG. 1.

FIG. 3 is a functional block diagram illustrating a functional structure example of the imaging apparatus 1. Various operations (processes) of the imaging apparatus 1 are controlled by a processor 104 consisting of a digital signal processing IC (Integrated Circuit), or the like, and by an imaging program executed by the processor 104.

The processor 104 as an image processing unit includes a first CCD (Charge Coupled Device) signal processing block 104-1 and a second CCD signal processing block 104-2. Also, the processor 104 includes a CPU (Central Processing Unit) block 104-3 and a local SRAM (Static Random Access Memory) 104-4.

Also, the processor 104 includes a USB (Universal Serial Bus) block 104-5 and a serial block 104-6. Also, the processor 104 includes a JPEG (Joint Photographic Experts Group) CODEC block 104-7 and a resize (RESIZE) block 104-8.

Also, the processor 104 includes a TV signal display block 104-9 and a memory card controller block 104-10. Each of the blocks are connected to each other via a bus line.

Outside the processor 104, an SDRAM (Synchronous Dynamic Random Access Memory) 103 for storing RAW-RGB image data, YUV image data and JPEG image data is placed. Also, outside the processor 104, a RAM (Random Access Memory) 107 is placed.

Furthermore, outside the processor 104, an embedded memory 120 and a ROM (Read Only Memory) 108 in which a control program as an imaging program is stored are placed. The SDRAM 103, the RAM 107 and the ROM 108 are connected to the processor 104 via the bus line.

The processor 104 executes the various control programs stored in the ROM 108 and performs functions of the various control programs.

The SDRAM 103 corresponds to a frame memory. In the various control programs stored in the ROM 108, an image processing program which realizes operations of the image processing apparatus according to the present invention is included.

In other words, an image processing method according to the present invention is performed in the imaging apparatus 1 by causing the processor 104 to execute the image processing program stored in the ROM 108 and using the SDRAM 103, the RAM 107 and the embedded memory 120 corresponding to a memory unit. In other words, the imaging apparatus 1 includes functions of a signal separation unit and a color signal control unit of the image processing apparatus according to the present invention.

The processor 104 is physically a computer which mainly includes the CPU block 104-3, and the like, connected to each other via the bus, and the CPU block 104-3 executes the image processing program stored in the ROM 108. That is, the processor 104 with the above configuration performs the following image processes for image data.

The image processing programs are stored in the ROM 108 in advance. Here, the image processing programs can be stored in a memory card (not shown) and can be written to the ROM 108. Or, the image processing programs may be downloaded to the ROM 108 from a network (not shown).

The barrel unit 7 included in the imaging optical system includes a FOCUS optical system 7-2 with a FOCUS lens 7-2*a*, and an iris unit 7-3 with an iris 7-3*a*.

The FOCUS optical system 7-2 is driven by a FOCUS motor 7-2*b* as a FOCUS lens moving unit. Also, the iris unit 7-3 is driven by an iris motor 7-3*b*.

Each motor of the FOCUS motor 7-2*b* and the iris motor 7-3*b* is driven by a motor driver 7-5. Operations of the motor driver 7-5 are controlled by the CPU block 104-3 of the processor 104.

The FOCUS lens 7-2*a* included in the barrel unit 7 constitutes an imaging lens which forms a subject image on an acceptance surface of a CCD 101 as an imaging element.

The CCD 101 converts the subject image formed on the acceptance surface to an electrical image signal and outputs to a F/E (Front/End)-IC 102.

It should be noted that, in the imaging apparatus 1, the imaging element as an imaging unit for obtaining image data is not limited to a CCD, and, for example, a CMOS (Complementary Metal Oxide Semiconductor) may be used.

The F/E-IC 102 includes a CDS (Correlated Double Sampling) unit 102-1, an AGC (Auto Gain Control) 102-2 and an A/D (Analog/Digital) conversion unit 102-3. The F/E-IC 102 performs a predetermined process for the image signal converted from the subject image and converts to a digital image signal. The converted digital image signal is input to the CCD signal processing block 104-1. These operations of signal processing are controlled by a VD signal (Vertical Driving signal) output from the CCD signal processing block 104-1 of the processor 104 and an HD signal (Horizontal Driving Signal) via a TG (Timing Generator) 102-4.

The CCD signal processing block 104-1 performs signal processing of white balance adjustment, gamma adjustment, and the like, for the digital image data input from the CCD 101 via the F/E-IC 102, and outputs the VD signal and the HD signal.

The USB block 104-5 is coupled to a USB connector 122. The serial block 104-6 is coupled to an RS-232C connector 123-2 via a serial driver circuit 123-1.

The TV signal display block 104-9 is coupled to an LCD monitor 10 via an LCD driver 117, and is also coupled to a video jack 119 via a video amplifier (AMP) 118.

<Operations of Imaging Apparatus>

Next, operations of the imaging apparatus 1 will be described. When the imaging apparatus 1 shown in FIG. 1 and FIG. 2 is started, the imaging apparatus 1 starts to operate in a recording mode.

The CPU block 104-3 controls the motor driver 7-5 and moves the barrel unit 7 to an imaging possible position. Furthermore, each of the CCD 101, the F/E-IC 102, the LCD monitor 10 and the like, is supplied with power and starts to operate. When power is supplied to each unit, operations in a finder mode start.

When the imaging apparatus 1 is operating in a finder mode, an image signal related to a subject image formed on the acceptance surface of the CCD 101 via the imaging lens is output to the CDS 102-1. The analog RGB signal is converted to a digital image signal by the A/D conversion unit 102-3 via an AGC (Automatic Gain Control) circuit 102-2.

Each of R/G/B signals included in this digital image signal is converted to YUV image data by a YUV conversion unit included in the second CCD signal processing block 104-2 of the processor 104, and recorded onto the SDRAM 103 as a frame memory.

It should be noted that the second CCD signal processing block 104-2 performs appropriate processes such as a filtering process for the RGB image signals and converts to the YUV image data.

The YUV image data are read by the CPU block 104-3, transferred to the video amplifier 118 and the video jack 119 via the TV signal display block 104-9, and displayed on a TV (television) set connected to the video amplifier 118 and the video jack 119.

Also, the YUV image data read by the CPU block 104-3 are transferred to the LCD monitor 10 via the LCD driver 117 and used for a display. The above process is performed at 1/30 second intervals, so the display is updated, and thereby images of the subject as an imaging target can be taken while the subject is monitored by the display of the LCD monitor 10.

Multiple driving modes (driving conditions) can be set for the CCD 101. Using these driving modes, an output condition for an image signal output from the CCD 101 can be changed.

<<Image Processing Apparatus (1)>>

Next, an embodiment of an image processing apparatus according to the present invention will be described.

Figure 4:
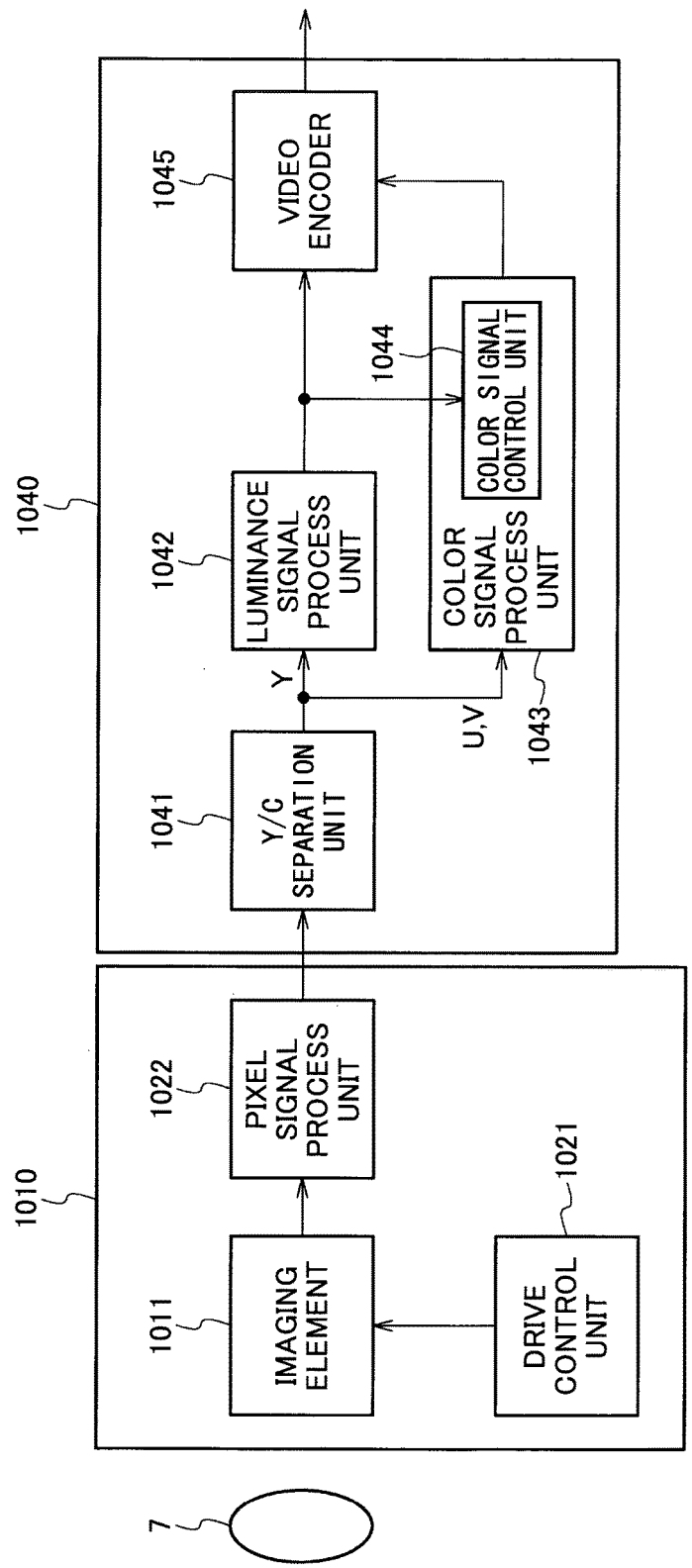
FIG. 4 is a block diagram illustrating an embodiment of an image processing apparatus according to the present invention.

FIG. 4 is a block diagram illustrating an embodiment of an image processing apparatus 1040 according to the present invention. As shown in the figure, the image processing apparatus 1040 is connected to an imaging unit 1010 and obtains image data taken by the imaging unit 1010. Here, the image processing apparatus 1040 is configured in the processor 104 of the imaging apparatus 1.

The imaging unit 1010 includes an imaging element 1011, a drive control unit 1021 and a pixel signal processing unit 1022.

The imaging element 1011 is, for example, the CCD 101, or a CMOS sensor, and outputs image data based on a subject image formed on the acceptance surface by the barrel unit 7 (imaging optical system). Here, the imaging element 1011 outputs in order the image data as pixel information based on a horizontal synchronization signal and a vertical synchronization signal from the drive control unit 1021.

The drive control unit 1021 and the pixel signal processing unit 1022 are configured in the F/E-IC 102 of the imaging apparatus 1.

The drive control unit 1021 outputs, as signals for controlling the above imaging element 1011, an exposure adjustment signal in addition to the horizontal synchronization signal and the vertical synchronization signal, and controls the imaging element 1011.

The pixel signal processing unit 1022 processes a signal of image data output by the imaging element 1011. Here, the pixel signal processing unit 1022 performs signal processes for each pixel such as Bayer interpolation, AGC (Automatic Gain Control), gamma compensation, and the like. Also, the pixel signal processing unit 1022 performs a process for pixels surrounding a predetermined pixel (surrounding pixel process).

The pixel signal processing unit 1022 outputs a pixel-processed signal to the image processing apparatus 1040 configured in the processor 104. The image data output from the pixel signal processing unit 1022 is output by converting an analog signal detected by the imaging element 1011 to an about 8 to 12 bits digital signal.

Here, signal formats of the output signal from the pixel signal processing unit 1022 include, in the case of parallel output, RGB (Red, Green, and Blue), CMY (Cyan, Magenta, and Yellow), and the like. Also, signal formats of the output signal from the pixel signal processing unit 1022 include, in the case of serial output, MIPI (Mobile Industry Processor Interface), LVDS (Low Voltage Differential Signaling), and the like.

The image processing apparatus 1040 includes a Y/C separation unit (YUV conversion unit) 1041, a luminance signal processing unit 1042, a color signal processing unit 1043, a color signal control unit 1044 and a video encoder 1045.

The Y/C separation unit 1041 is a matrix circuit for converting a pixel signal output from the pixel signal processing unit 1022 such as RGB, CMY, or the like, to a luminance signal (Y) and a color signal (U, V). Specifically, the Y/C separation unit 1041 converts the pixel signal according to, for example, a conversion formula shown in formula (1).

$$\begin{pmatrix} Y \\ U \\ V \end{pmatrix} = \begin{pmatrix} 0.299 & 0.587 & 0.114 \\ -0.169 & -0.331 & 0.500 \\ 0.500 & -0.419 & -0.081 \end{pmatrix} \begin{pmatrix} R \\ G \\ B \end{pmatrix} \quad (1)$$

It should be noted that in the case where the pixel signal output from the pixel signal processing unit 1022 is already a YUV signal, the image processing apparatus 1040 does not perform the matrix conversion process by the Y/C separation unit 1041 and performs a subsequent process.

The luminance signal (Y) and the color signal (U, V) separated by the Y/C separation unit 1041 go through required signal processes according to the signals.

The luminance signal processing unit 1042 performs digital gain adjustment, and the like, for the luminance signal.

The color signal processing unit 1043 performs AWB (Auto White Balance) adjustment, or the like, for the color signal.

The color signal control unit 1044 controls the color signal after the separation by the Y/C separation unit 1041. Here, the color signal control unit 1044 controls chroma of the color signal based on the luminance signal separated by the Y/C separation unit 1041. Specifically, the color signal control unit 1044, in the case where the obtained pixel is a high luminance (bright) pixel, increases the chroma of the pixel, and, in the case where the obtained pixel is a low luminance (dark) pixel, decreases the chroma of the pixel.

It should be noted that the color signal control unit 1044 may control the chroma of the pixel based on either the luminance signal output from the luminance signal processing unit 1042 or the luminance signal before the luminance signal process.

Also, the processes of the color signal processing unit 1043 and the color signal control unit 1044 may be performed by, for example, an FPGA (Field-Programmable Gate Array), or may be performed by the image processing program described above.

Next, specific color signal control processes by the color signal control unit 1044 will be described.

When controlling the color signal based on the luminance signal, the color signal control unit 1044 uses a signal in which the luminance signal (Y) is multiplied by a coefficient α. Based on the signal (1+αY), assuming a signal obtained by multiplying the (U, V) signal output from the Y/C separation unit 1041 by (1+αY) as a signal (U', V'), the signal (U', V') is shown in the following formula (2).

$$(U', V') = (1+\alpha Y)\beta(U, V) \quad (2)$$

(1+αY) is a coefficient for increasing or decreasing the color signal value based on the luminance signal because the value of formula (2) becomes 0 in the case where the luminance Y is 0. That is, in the case where Y of the signal (1+αY) is 0, (U', V')=β(U, V), and the effect of the chroma fluctuation by the luminance signal in formula (2) becomes 0.

Here, the coefficient α is an arbitrary coefficient (parameter) for controlling the chroma value based on the luminance value. Also, the coefficient α is not limited to one value, and, for example, a plurality of values may be used depending on the situation.

According to formula (2), in the case where a Y component is big, that is, the luminance is high (bright), the chroma increases because the coefficient (1+αY)β related to the color signals U and V becomes big. Also, according to formula (2), in the case where a Y component is small, that is, the luminance is low (dark), the chroma decreases because the coefficient (1+αY)β related to the color signals U and V becomes small.

Here, the coefficient β is a coefficient for controlling the chroma fluctuation. In other words, in formula (2), in the case where the value of β is big, the chroma fluctuation becomes big, and in the case where the value of β is small, the chroma fluctuation becomes small.

The following formula (3) is derived from formula (2) by deriving a matrix formula for converting the U signal and the V signal based on the luminance signal.

$$\begin{pmatrix} R \\ G \\ B \end{pmatrix} = \begin{pmatrix} 1.000 & 0 & 1.402 \\ 1.000 & -0.344 & -0.714 \\ 1.000 & 1.772 & 0 \end{pmatrix} \begin{pmatrix} Y \\ U \\ V \end{pmatrix} \quad (3)$$

Figure 5:
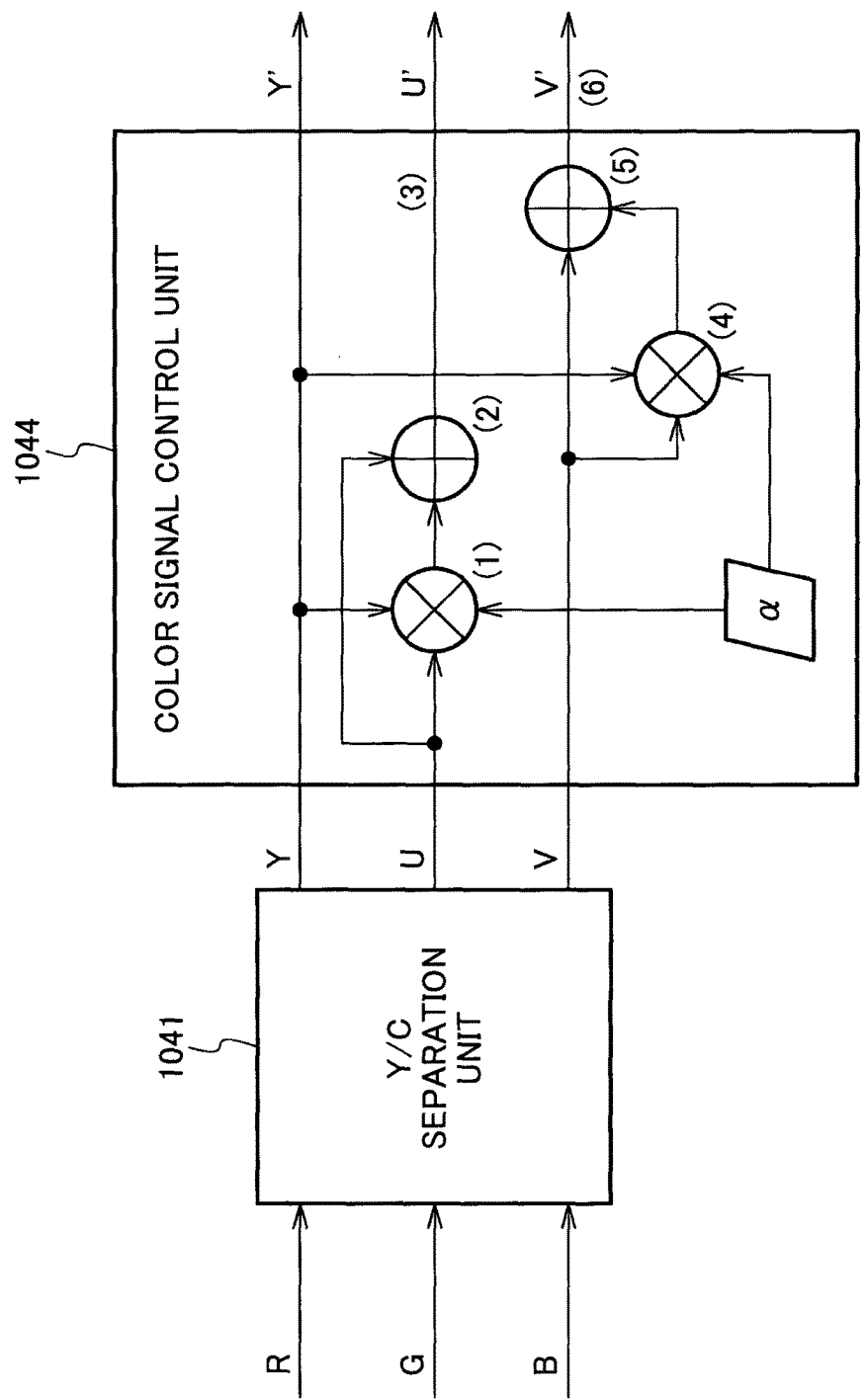
FIG. 5 is a block diagram illustrating the image processing apparatus of FIG. 4.

FIG. 5 is a block diagram illustrating the color signal control unit 1044 of the image processing apparatus 1040 of FIG. 4. As shown in the figure, the color signal control unit 1044 includes a multiplier (1), an adder (2), a multiplier (4) and an adder (5).

The multiplier (1) multiplies the color signal (U) output from the Y/C separation unit 1041 by a value obtained by multiplying the luminance signal (Y) by the coefficient α.

The adder (2) outputs a result of adding the color signal (U) to the multiplying result of the multiplier (1) as U' (3).

The multiplier (4) multiplies the color signal (V) output from the Y/C separation unit 1041 by a value obtained by multiplying the luminance signal (Y) by the coefficient α.

The adder (5) outputs a result of adding the color signal (V) to the multiplying result of the multiplier (4) as V' (6).

By using the multiplier (1), the adder (2), the multiplier (4) and the adder (5) described above, the color signal control unit 1044 can implement the operation of formula (3) which is described above.

By converting the color signal of the output image data using formula (3), the color signal control unit 1044 can increase the chroma for the subject with high luminance included in the image data such as a light source and the chroma for the image area surrounding the subject.

In other words, according to the image processing apparatus 1040, for example, the color of the traffic signal at night can be clearly recognized. Also, according to the image processing apparatus 1040, an image with more natural color can be generated because the chroma of the low luminance area is not extremely increased.

A signal processed by the color signal control unit 1044 is input to a process circuit of the output stage. In the case where the direct YUV input is available, the signal after the image processing is directly input to the video encoder 1045.

In the case where the input signal of the image data for the output processing circuit is an RGB signal, it is necessary to convert again from YUV signal to RGB signal in the imaging apparatus 1. In the above case, a conversion formula such as formula (4) is used.

$$\begin{pmatrix} Y' \\ U' \\ V' \end{pmatrix} = \begin{pmatrix} 1 & 0 & 0 \\ 0 & (1+\alpha Y)\beta & 0 \\ 0 & 0 & (1+\alpha Y)\beta \end{pmatrix} \begin{pmatrix} Y \\ U \\ V \end{pmatrix} \quad (4)$$

Here, the output processing circuit is, in the case where the camera output is an analog composite signal, for example, the video encoder 1045 with a built-in DAC (Digital Analog Converter). The image data are, by using the output processing circuit, converted to a signal compliant with analog video standards such as NTSC (National Television System Committee) system, D2 standards, D4 standards, etc.

Also, the output processing circuit is, in the case where the camera output is a digital output, for example, a serializer which converts a parallel signal to a serial signal, or a circuit which converts the signal to a signal compliant with other digital output signal standards. Here the other digital output signal standards include Ethernet (Registered trademark), USB (Universal Serial Bus), MOST (Media Oriented Systems Transport: Registered trademark), and the like.

It should be noted that in the case where there is no specific signal processing, the imaging apparatus 1 outputs the image data without YUV conversion.

It should be noted that the image processing apparatus according to the present invention is not limited to being mounted on the imaging apparatus, but may be mounted on various apparatuses such as, for example, an image display apparatus, which include an image processing apparatus.

<<Image Processing Apparatus (2)>>

Next, another embodiment of an image processing apparatus according to the present invention will be described. In the following description, only a matrix formula will be described, which is used in the color signal control unit and is a difference between this other image processing apparatus and the image processing apparatus 1040 described above.

Figure 6:
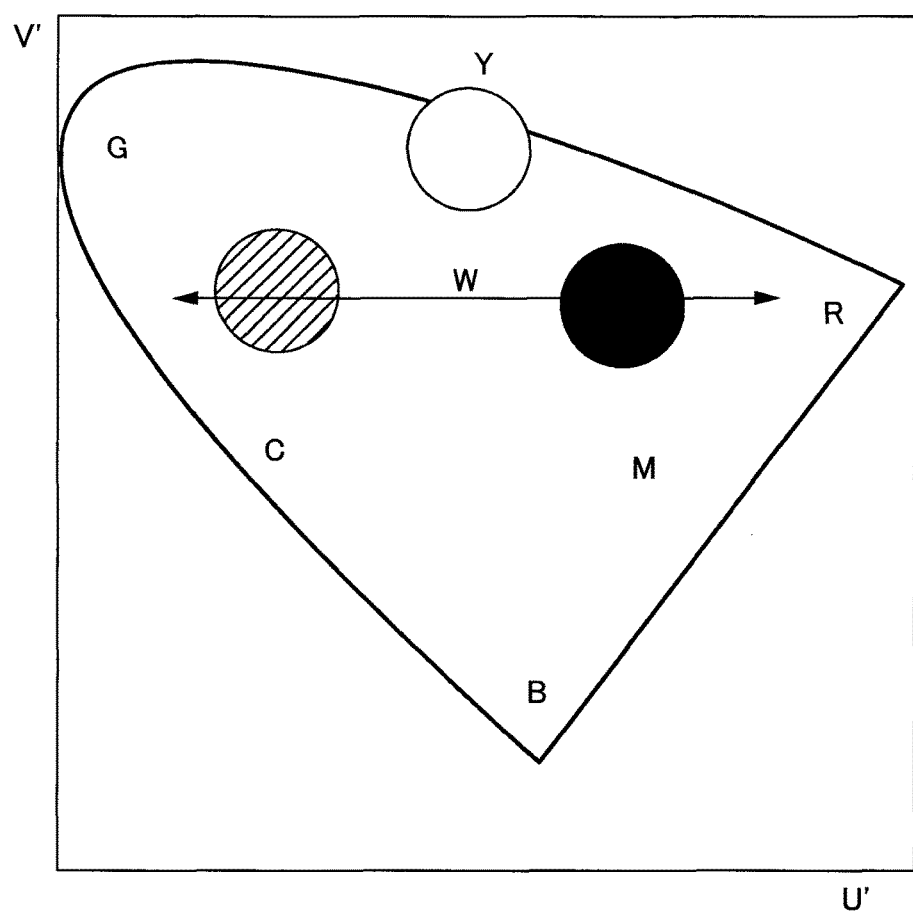
FIG. 6 is a UV chromaticity diagram.

FIG. 6 is a UV chromaticity diagram. As shown in the figure, colors on the UV chromaticity diagram are represented by R (Red), G (Green), B (Blue), C (Cyan), M (Magenta), Y (Yellow), and W (White).

As shown in FIG. 6, blue, yellow, and red, which are typical emission colors of a traffic signal, are represented by a circle with oblique lines, a white circle, and a black circle, respectively. Here, the blue color of a traffic signal is, in general, a green which is greener than cyan.

Also, U and V axes of color signal are represented in an arrow in FIG. 6. In other words, blue color and red color of a traffic signal are located along U axis of a color signal.

The image processing apparatus 1040, in order to increase color discrimination rate especially between the red signal and the blue signal, increases the chroma of color component in the U axis direction on the UV chromaticity diagram. That is, the image processing apparatus 1040 increases the distance between the positions of the blue color area and the red color area of a traffic signal on the UV chromaticity diagram.

Here, the color signal control unit 1044, instead of using the coefficient α of matrix formula (3) described above, uses different coefficients $\alpha_U$ and $\alpha_V$ for color signal (U) and color signal (V), respectively. Here, a matrix formula used by the color signal control unit 1044 is the following formula (5).

$$\begin{pmatrix} Y' \\ U' \\ V' \end{pmatrix} = \begin{pmatrix} 1 & 0 & 0 \\ 0 & (1+\alpha_v Y)\beta & 0 \\ 0 & 0 & (1+\alpha_v Y)\beta \end{pmatrix} \begin{pmatrix} Y \\ U \\ V \end{pmatrix} \quad (5)$$

In the image processing apparatus 1040, when it is assumed that for the coefficients of formula (5), $\alpha_U > \alpha_V$, because the component value in the U axis direction is greater than the component value in the V axis direction in a high luminance area, color discrimination of the traffic signal in the image is easy.

Also, in the image processing apparatus 1040, blue color and yellow color are not emphasized by not increasing the color signal (V) more than necessary in a high luminance area. As a result, according to the image processing apparatus 1040, it can be avoided that an image is output, whose chroma is extremely high thereby creating an uncomfortable feeling, and it can be achieved that an image is output, whose color is closer to natural.

<<Benefits>>

As described above, according to the image processing apparatus 1040, the following benefits will be obtained.

That is, the image processing apparatus 1040 includes the Y/C separation unit 1041 which separates color signals U and V and a luminance signal Y included in the image data, and the color signal control unit 1044 which controls the color signals U and V used for image processing based on the luminance value of the luminance signal Y.

Here, the benefits of the image processing apparatus 1040 will be described by comparing the image processing apparatus 1040 and an image processing apparatus of a reference example.

Figure 7:
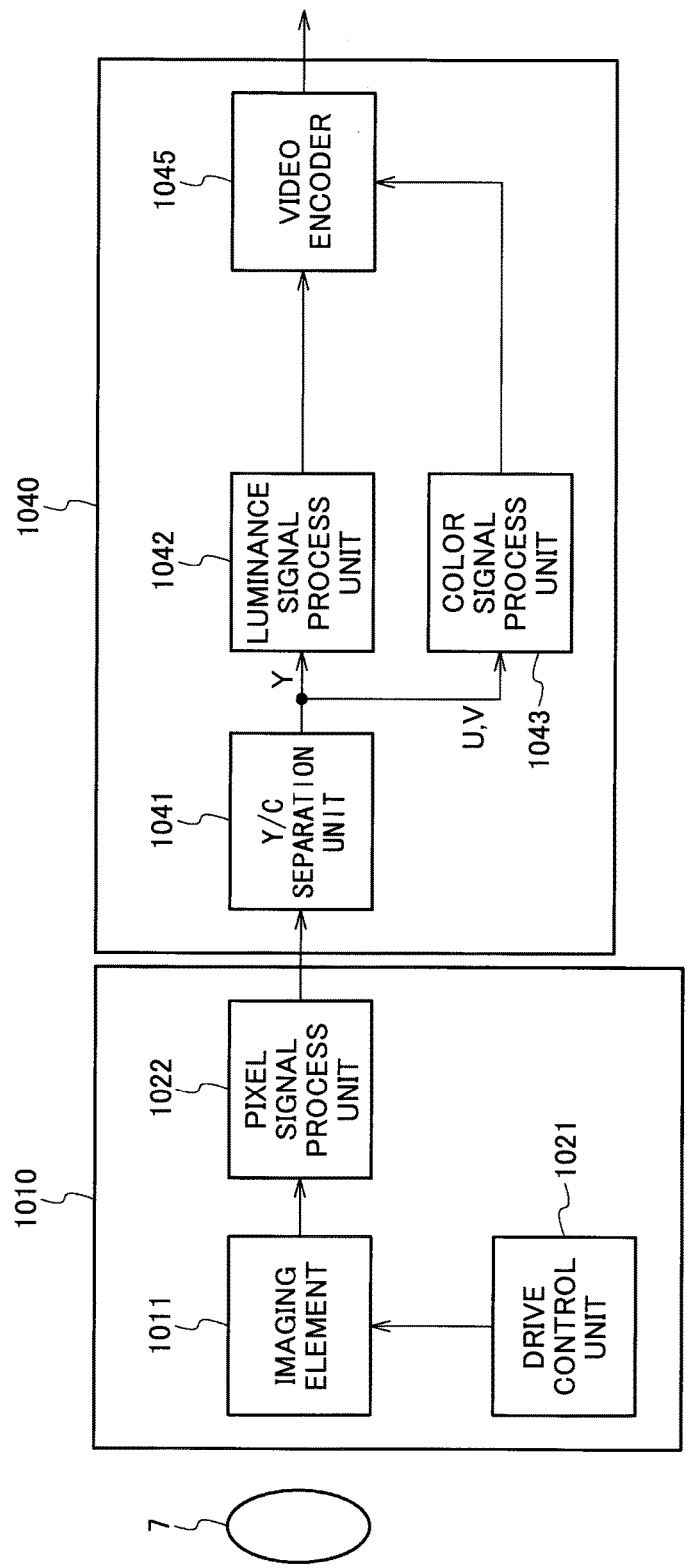
FIG. 7 is a block diagram illustrating an embodiment of an image processing apparatus according to a reference example.

FIG. 7 is a block diagram illustrating an embodiment of an image processing apparatus according to a reference example. As shown in the figure, the image processing apparatus of the reference example has the same configuration as the image processing apparatus 1040 except for not including the color signal control unit 1044.

Figure 8:
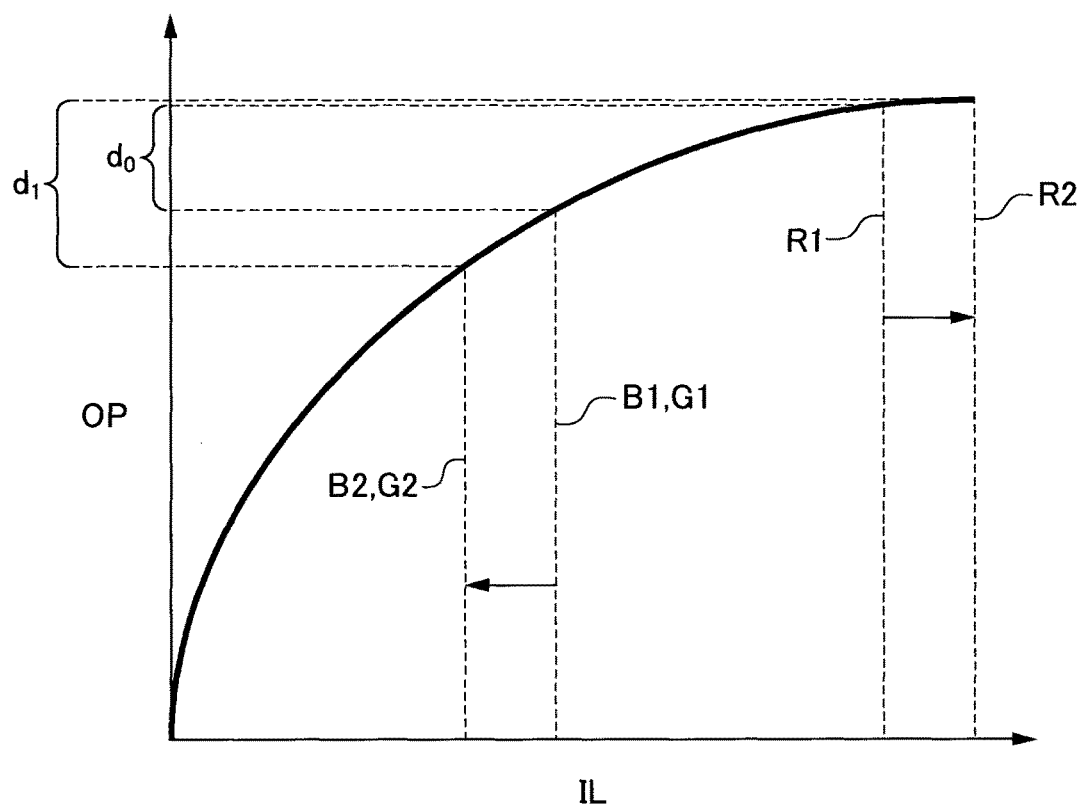
FIG. 8 is a graph showing a relationship between an input luminance for a pixel array and a signal output level in the image processing apparatus of FIG. 4 and the image processing apparatus of FIG. 7.

FIG. 8 is a graph of input/output characteristics indicating a relationship between an input luminance IL for a pixel element 101 and a signal output level OP in the image processing apparatus of FIG. 4 and the image processing apparatus of FIG. 7. As shown in the figure, the horizontal axis is input luminance IL to the imaging element 1041 and the vertical axis is signal output level OP. Also, the solid line in the figure indicates input/output characteristics.

As shown in FIG. 8, because the input/output characteristics have y characteristics in which, even when the value of input luminance IL of the horizontal axis increases, the value of signal output level OP of the vertical axis does not increase as much as the value of input luminance IL does, the input/output characteristics are represented by a curve in which the value of the signal output level OP does not increase as much as the input luminance IL does.

Here, in the case where color of the image of a red signal of a traffic signal as a self-luminous object is input, the input luminance IL and the signal output level OP of the blue color component and the green color component of the image processing apparatus of the reference example are represented by B1 and G1 in FIG. 8.

Also, in the case where color of the image of a red signal is input, the input luminance IL and the signal output level OP of the red color component of the image processing apparatus of the reference example is represented by R1 in FIG. 8.

As shown in FIG. 8, in the image processing apparatus of the reference example, the signal output level of the red component output from the imaging element 1010 is at the position of R1 in the figure, and is in an almost saturated state.

In other words, in the image processing apparatus of the reference example, for the input luminance of high luminance, a difference $d_0$ in the output signal level OP between the blue color component, green color component and the red color component is little. As a result, regarding the red color subject with high luminance output from the image processing apparatus of the reference example, its color becomes lighter due to mixed color, and, for example, the discrimination of the red color of the traffic signal becomes difficult.

Here, in the case where color of the image of a red signal of a traffic signal as a self-luminous object is input, the input luminance IL and the signal output level OP of the blue color component and the green color component of the image processing apparatus 1040 are represented by B2 and G2 in FIG. 8.

Also, in the case where color of the image of a red signal is input, the input luminance IL and the signal output level OP of the red color component of the image processing apparatus 1040 are represented by R2 in FIG. 8.

In other words, the image processing apparatus 1040, by using the color signal control unit 1044, controls the chroma of color signals U and V based on the luminance value of the luminance signal Y, increases the chroma of a pixel in the case of the pixel with high luminance (bright pixel), and decreases the chroma of a pixel in the case of the pixel with low luminance (dark pixel).

Here, the color signal control unit 1044, according to the above matrix formula (3) with the coefficient α determined based on the luminance value of the luminance signal Y, controls the chroma of the color signals U and V.

Also, the color signal control unit 1044 may use, as shown in the above matrix formula (5), and coefficients $\alpha_U$ and $\alpha_V$ which have different values, the $\alpha_V$ being the coefficient of a component of the color signals U and V in the V axis direction and the $\alpha_U$ being the coefficient of a component of the color signals in the U axis direction.

In other words, the color signal control unit 1044, by using the above matrix formula (3) or (5), in the color signals U and V, makes the red color component of the color signal stronger than the blue color component or the green color component of the color signals.

With the above configurations, in the image processing apparatus 1040, the color signal control unit 1044, according to the matrix formula (3) or (5), provides the red color component R2 of the signal output level OP corresponding to the input luminance IL of a high luminance and the blue color component and the green color component B2 and G2, the difference of which is enlarged to $d_1$.

In other words, according to the image processing apparatus 1040, the color discrimination of the subject with high luminance (e.g., red light or blue light) included in the dark image data becomes easy.

The present application is based on Japanese Priority Application No. 2014-053025 filed on Mar. 17, 2014 with the Japanese Patent Office, the entire contents of which are hereby incorporated by reference.

DESCRIPTION OF THE REFERENCE NUMERALS 1010 imaging unit
1011 imaging element
1021 drive control unit
1022 pixel signal process unit
1040 image processing apparatus
1041 Y/C separation unit
1042 luminance signal process unit
1043 color signal process unit
1044 color signal control unit
1045 video encoder

RELATED ART DOCUMENT

Patent document 1: Japanese Patent Application Publication No. 2013-98805

The invention claimed is:

1. An image processing apparatus for performing image processing for image data, the image processing apparatus comprising:
    circuitry configured to
        separate a color signal and a luminance signal included in the image data, and
        control the color signal used for the image processing based on a luminance value of the luminance signal, and make a red color component of the color signal stronger than a blue color component or a green color component of the color signal.

2. The image processing apparatus according to claim 1, wherein the circuitry is configured to control the color signal by controlling a chroma of the color signal based on the luminance value.

3. The image processing apparatus according to claim 1, wherein the circuitry is configured to control the color signal so that the chroma for an area in the image data, the luminance value of which is high, becomes high.

4. The image processing apparatus according to claim 1, wherein the circuitry is configured to control the chroma of the color signal by using a coefficient defined based on the luminance value of the luminance signal.

5. The image processing apparatus according to claim 4, wherein the circuitry is configured to use a first coefficient of a component of the color signal in a V axis direction and a second coefficient of a component of the color signal in a U axis direction, values of the first coefficient and the second coefficient being different.

6. An imaging apparatus comprising:
    an imaging device configured to obtain image data; and
    an image processing apparatus configured to perform image processing for the image data, wherein the image processing apparatus is the image processing apparatus according to claim 1.

7. An image processing method for performing image processing for image data, the image processing method comprising:
    separating a color signal and a luminance signal from the image data;
    controlling the color signal which is used for the image processing based on a luminance value of the luminance signal; and
    making a red color component of the color signal stronger than a blue color component or a green color component of the color signal.

8. A non-transitory computer-readable storage medium including computer executable instructions, wherein the instructions, when executed by a computer, cause the computer to perform a method, the method comprising:
    separating a color signal and a luminance signal from image data;
    controlling the color signal which is used for image processing based on a luminance value of the luminance signal; and
    making a red color component of the color signal stronger than a blue color component or a green color component of the color signal.

9. An image processing apparatus for performing image processing for image data, the image processing apparatus comprising:
  circuitry configured to
    separate a color signal and a luminance signal included in the image data, and
    control the color signal used for the image processing based on a luminance value of the luminance signal, and make one color component of the color signal stronger than other color components of the color signal, wherein
  the circuitry is further configured to use a first coefficient of a component of the color signal in a V axis direction and a second coefficient of a component of the color signal in a U axis direction, values of the first coefficient and the second coefficient being different.

* * * * *